United States Patent Office 3,434,489
Patented Mar. 25, 1969

3,434,489
FAIL SAFE FLUID REGULATOR
Edward M. Pauwels, South Bend, Ind., assignor to The Bendix Corporation, South Bend, Ind., a corporation of Delaware
Filed Mar. 22, 1965, Ser. No. 441,672
Int. Cl. G05d *11/02;* F01b *25/06*
U.S. Cl. 137—98                                         3 Claims

ABSTRACT OF THE DISCLOSURE

Fluid regulating apparatus having a movable fluid control valve and control means connected thereto wherein the control means includes a force balance lever carried in a chamber vented to a low pressure drain source and a plurality of fluid pressure responsive members each of which has one side exposed to the chamber and an opposite side exposed to an associated pressurized control fluid. The drain source pressure does not exceed any of the control fluid pressures so that leakage of the relatively higher pressure control fluids through the pressure responsive members in the event of failure thereof is confined to the drain source thereby isolating the control fluids to provide fail safe operation. Also, the force balance lever does not require fluid seals since it is wholly contained in the chamber vented to the drain source.

---

The present invention is an improvement over the fuel pressure head regulator disclosed in application Ser. No. 403,071 filed Oct. 12, 1964, in the name of W. J. Kestermeier and having a common assignee. In said application Ser. No. 403,071, now abandoned, a fuel pressure differential $P_1-P_4$ across a plurality of variable area metering orifices is controlled as a function of a compressor air pressure differential, $P_c-P_a$, by a fuel bypass valve. The fuel bypass valve is positioned by a lever in response to opposing forces derived from the air pressure differential $P_c-P_a$ acting upon one diaphragm and the fuel pressure differential, $P_1-P_4$, acting upon another diaphragm. The air and fuel sections are separated by a flexible seal which normally prevents flow therebetween.

A significant disadvantage of the abovementioned fuel pressure regulator of application Ser. No. 403,071 is that a rupture of either of the diaphragms responsive to the air pressure differential, $P_c-P_a$, and fuel pressure differential, $P_1-P_4$, results in a failure condition of operation of the bypass valve and an uncontrollable flow of fuel at pressure $P_1$ to the engine. A failure of the flexible seal between the air and fuel sections will permit high pressure fuel to enter the air section thereby causing a failure condition.

Another disadvantage is that air or vapor tends to be trapped in the $P_4$ fuel pressure chamber exposed to the one side of the fuel pressure responsive diaphragm thereby reducing the efficiency and response of the fuel pressure head regulator.

The present invention proposes to avoid the abovementioned shortcomings by providing a plurality of diaphragms each of which is exposed on one side to a chamber vented to a drain source and on the opposite side to a fuel pressure or control air pressure whereby rupture of any of the diaphragms permits fuel or air, as the case may be, to pass into the chamber from which it flows harmlessly to the drain source. Also, a lever connected to be actuated by the plurality of diaphragms is wholly contained by said chamber thereby eliminating the need for a fluid seal at any point along the length thereof.

It is an object of the present invention to provide a fail safe fuel pressure regulator wherein a plurality of flexible pressure responsive members are each exposed on one side to a relatively low drain fluid pressure and on the opposite side to an associated relatively high fuel or air pressure such that leakage of any one or more of the fluids at relatively high fuel or air pressure through its associated diaphragm will not affect the pressurization of the remaining diaphragms.

It is an object of the present invention to provide a fail safe fluid pressure regulator having a plurality of relatively high fluid pressures wherein at least one fluid pressure is controlled as a function of the remaining fluid pressures.

It is another object of the present invention to provide linkage means for connecting a plurality of pressure responsive members responsive to different relatively high fluid pressures wherein the entire linkage means is exposed to a relatively low fluid drain pressure thereby eliminating the need for fluid seals at any portion thereof.

Other objects and advantages of the present invention will be apparent from the following description and accompanying drawings wherein:

The drawing represents a fuel control system embodying the present invention.

Referring to the drawing, numeral 10 represents the fuel control disclosed in the aforementioned copending application Ser. No. 403, 071. The control 10 is shown in block form with a portion broken away to disclose the improved portion thereof, namely, fuel pressure head regulator 12. The fuel control 10 includes a variable area governor valve structure generally indicated by 11 which is positioned as a function of the position of a speed control lever 14 and engine speed, the latter being supplied via rotatable input member 16 and attached centrifugal speed weight assembly generally indicated by 17. The fuel control 10 also includes a fuel pump, not shown, driven by input member 16 and adapted to receive fuel from a suitable source at pressure $P_0$ and discharge unmetered fuel at pressure $P_1$ to the interior of control 10.

The aforementioned governor valve imposes a variable flow area where fuel flow undergoes a drop from unmetered fuel pressure $P_1$ to metered fuel pressure $P_2$. From the governor valve fuel at pressure $P_2$ flows to a temperature compensator flow control 18 via a passage 20. The temperature compensator flow control 18 includes a valve, not shown, positioned as a function of a sensed temperature, $T_2$, which imposes a first variable area in series with the governor valve and a drop in fuel pressure from $P_2$ to $P_3$. From the temperature compensator flow control 18 fuel at pressure $P_3$ flows to an altitude compensator flow control 22 via passage 24. The altitude compensator flow control 22 includes a variable area valve 26 which is positioned as a function of atmospheric air pressure $P_a$ by mechanism, not shown. The valve 26 imposes a second variable area in series with the governor valve and a drop in fuel pressure from $P_3$ to $P_4$. From the altitude compensator flow control 22 fuel at metered pressure $P_4$ passes to the engine, not shown, via conduit 28.

The fuel pressure drop $P_1-P_4$ across the aforementioned variable area valves is controlled as a function of the differential between atmospheric air pressure $P_a$ and compressor discharge air pressure $P_c$ by the fuel pressure head regulator 12. The regulator 12 includes a chamber 30 partially defined by a diaphragm 32 and vented to unmetered fuel pressure $P_1$ via passages 34 and 36 and to fuel pump inlet pressure $P_0$ via a passage 38. A fuel bypass valve 40 fixedly secured to diaphragm 32 controls the effective flow area of passage 38 and thus the quantity of fuel bypass flow which, in turn, regulates the fuel pressure $P_1$ upstream from the governor valve accordingly. The diaphragm 32 is fixedly secured by means of a link 42 to a diaphragm 44 concentric therewith which partially defines a chamber 46 vented to compressor discharge air pressure $P_c$ via a passage 48. The opposing faces of diaphragms 32 and 44 are exposed to a chamber 50 which is vented to atmospheric air pressure $P_a$ via passage 52.

A lever 54 in chamber 50 is pivotally mounted on a support 56 which, in turn, is fixedly secured to the casing 58 of head regulator 12. The one end of lever 54 is pivotally secured to link 42 by a pin 60 or the like. The opposite end of lever 54 is pivotally secured by pin 62 to a link 64 which, in turn, is fixedly secured to a diaphragm 66 which separates chamber 50 from a chamber 68 containing fuel at pressure $P_4$. The chamber 68 is in series flow with conduit 28 and is provided with inlet and outlet ports 70 and 72, respectively.

The fuel pressure $P_1$ is limited to a predetermined maximum value by a spring loaded relief valve 74 which opens to vent passage 36 to a restricted passage 76 leading to the fuel pump inlet at pressure $P_0$.

The function of the head regulator 12 is to control the fuel bypass flow thereby regulating the fuel pressure $P_1$ and thrust the fuel pressure differential $P_1-P_4$ as a function of the air pressure differential $P_c-P_a$. Assuming the effective lever arms of lever 54 between pivot 56 and pins 60 and 62 to be equal and the effective area of diaphragms 32 and 66 to be equal, it will be noted that the forces derived from air pressure $P_a$ acting against the one side of diaphragms 32 and 66 cancel. The bypass valve 40 is urged in a closing direction by force derived from the air pressure differential $P_c-P_a$ acting across diaphragm 44 and in an opening direction by the fuel pressure differential $P_1-P_4$ acting across an effective area equivalent to the effective area of diaphragm 32 as can be proven readily by summation of the various forces acting through the associated lever arms. Thus, the fuel pressure differential $P_1-P_4$ is controlled to a constant value in accordance with a given air pressure differential $P_c-P_a$. Variations in either fuel pressure $P_1$ or $P_4$ for a given air pressure differential $P_c-P_a$ applied against diaphragm 44 will cause movement of bypass valve 40 in an opening or closing direction depending upon the relative change in fuel pressure $P_1$ or $P_4$ to thereby maintain the pressure differential $P_1-P_4$ at the required value.

The lever 54 is surrounded by chamber 50 at atmospheric pressure $P_a$ which eliminates any requirement for fluid seals pressing thereagainst which, in turn, reduces hysteresis in the system.

It will be noted that the air pressure $P_a$ in the chamber 50 is the lowest fluid pressure in the system and a rupture or other malfunction of any of the diaphragms 32, 44 or 66 will result in leakage of the corresponding pressurized air or fuel to chamber 50 without contaminating and/or pressurizing the remaining control fluids. The leakage of fluid into chamber 50 is vented to a suitable drain source such as an overboard drain or in the fuel tank as desired. The overboard drain may be preferred since fluid discharged from chamber 50 can be readily observed thereby indicating to the observer that a rupture of one or more of the diaphragms has occurred.

The chamber 68 is provided with separate inlet and outlet ports which allows trapped air or vapor in chamber 68 to be purged therefrom as pressurization of chamber 68 occurs. The elimination of trapped air or vapor in chamber 68 contributes to efficiency and/or optimum response characteristics of the head regulator.

It will be understood that various changes and modifications in the structure shown and described may be made by those persons skilled in the art without departing from the spirit of the invention. Various access openings may be provided to gain access to structural members housed within the regulator casing.

I claim:
1. Fluid pressure regulating means for controlling the fluid pressure differential across an orifice as a function of a control fluid pressure comprising:
   valve means for controlling the flow and thus pressure level of the fluid to the orifice;
   a first chamber vented to a relatively low pressure fluid drain source;
   a second chamber communicating with the fluid pressure upstream of the orifice;
   a third chamber communicating with the fluid pressure downstream of the orifice;
   a fourth chamber communicating with the control fluid pressure;
   a first fluid pressure responsive means having one surface exposed to said second chamber and an opposite surface exposed to said first chamber;
   a second fluid pressure responsive means having one surface exposed to said third chamber and an opposite surface exposed to said first chamber;
   a third fluid pressure responsive means having one surface exposed to said fourth chamber and an opposite surface to said first chamber; and
   lever means pivotally mounted in said first chamber and operatively connected to said valve means for actuating the same;
   said first fluid pressure responsive means being operatively connected to said lever means for loading the same;
   said second and third fluid pressure responsive means being operatively connected to said lever means for loading the same in opposition to said first fluid pressure responsive means.

2. Fluid pressure regulating means as claimed in claim 1 wherein:
   said second and third chambers communicate with a liquid;
   said fourth chamber communicates with a gas; and
   fluid leakage through said first, second or third fluid pressure responsive means is confined to said first chamber at relatively low pressures.

3. Fluid pressure regulating means as claimed in claim 2 wherein said fluid pressure responsive means are flexible diaphragms susceptible to rupture.

References Cited

UNITED STATES PATENTS

| | | | |
|---|---|---|---|
| 862,867 | 8/1907 | Eggleston. | |
| 2,285,540 | 6/1942 | Stein et al. | 137—86 X |
| 2,637,334 | 5/1953 | Starkey | 137—98 X |
| 2,820,435 | 1/1958 | Coar | 137—85 X |
| 3,034,294 | 5/1962 | Brown | 60—39.28 X |
| 3,195,308 | 7/1965 | McCombs | 60—39.28 |

WILLIAM F. O'DEA, Primary Examiner.

DAVID J. ZOBKIW, Assistant Examiner.

U.S. Cl. X.R.

60—39.28; 137—29